Jan. 4, 1949.    E. E. FOSTER    2,458,364
CLUTCH ACTUATOR AND ADJUSTER
Filed May 26, 1943    5 Sheets-Sheet 1

Inventor,
Edwin E. Foster
By Young, Emery & Thompson
Attorneys

Inventor,
Edwin E. Foster

By Young, Emery & Thompson
Attorneys

Jan. 4, 1949.　　　　　E. E. FOSTER　　　　2,458,364
CLUTCH ACTUATOR AND ADJUSTER
Filed May 26, 1943　　　　　　　　　　　　5 Sheets-Sheet 3
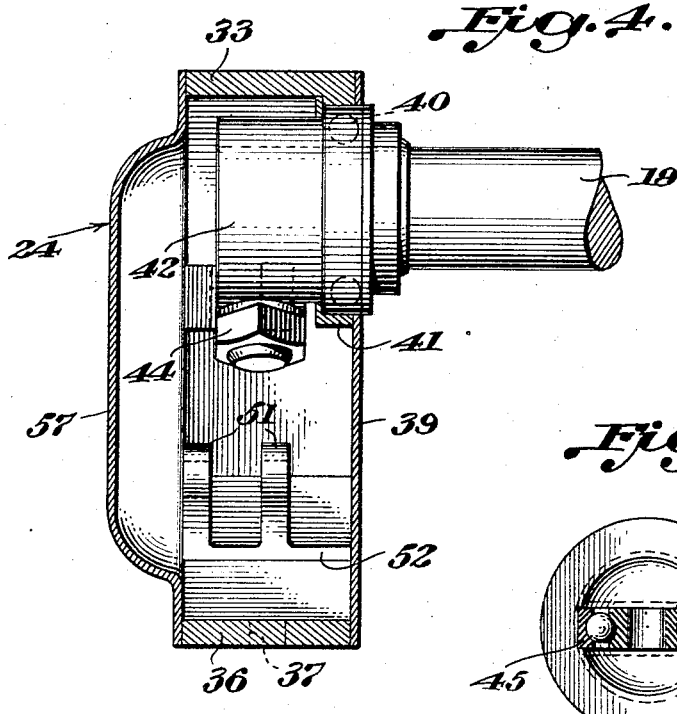
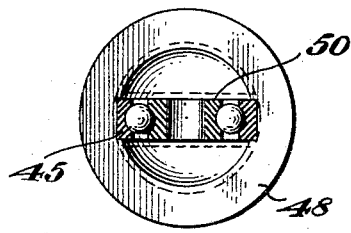
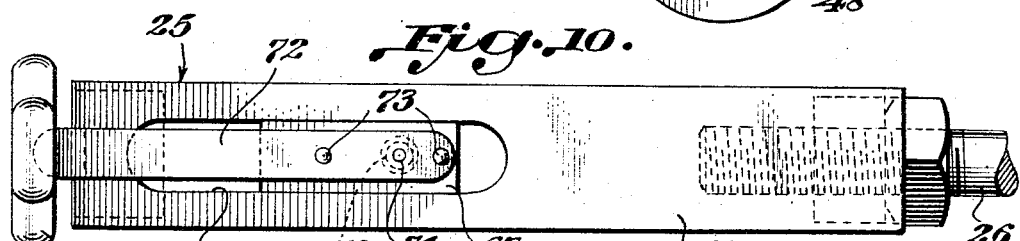
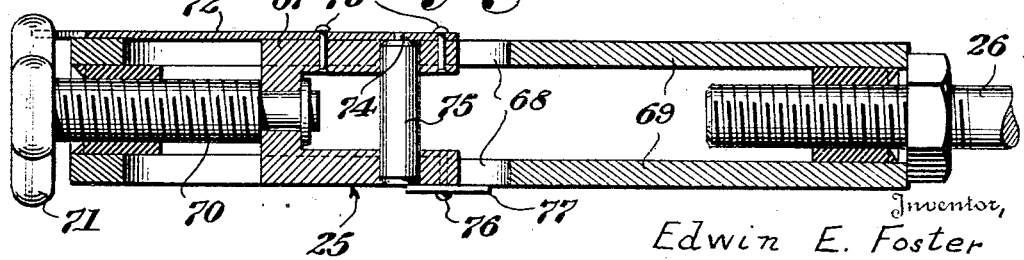
Inventor,
Edwin E. Foster
By Young, Emery & Thompson
Attorneys

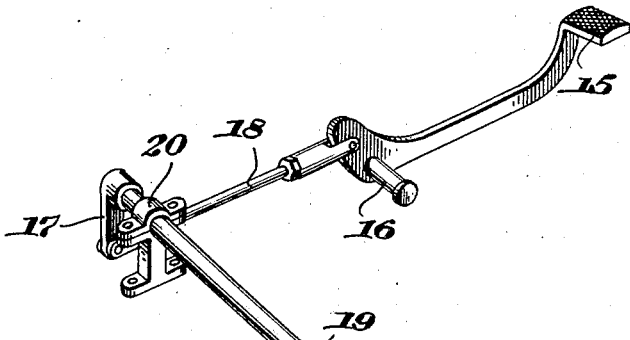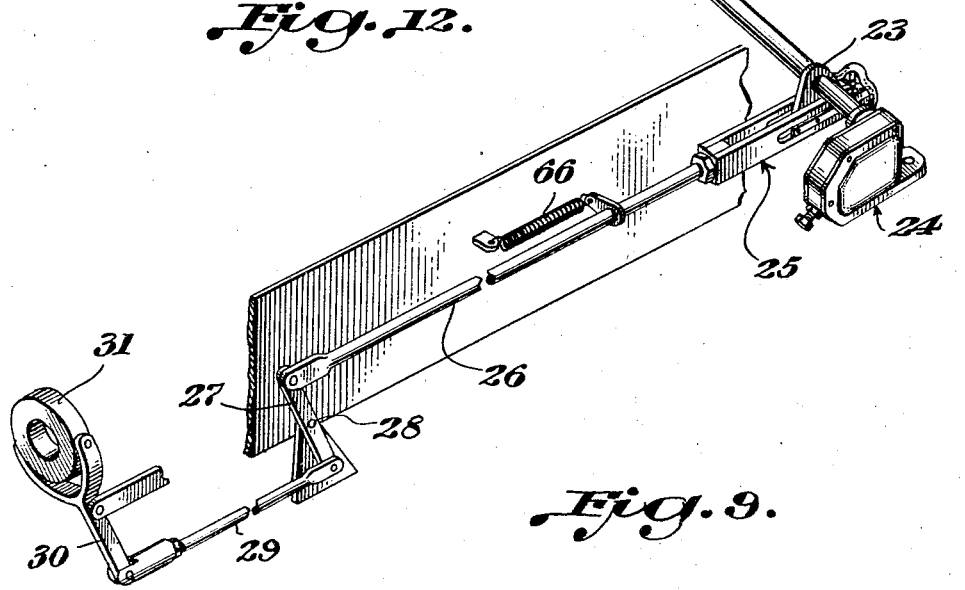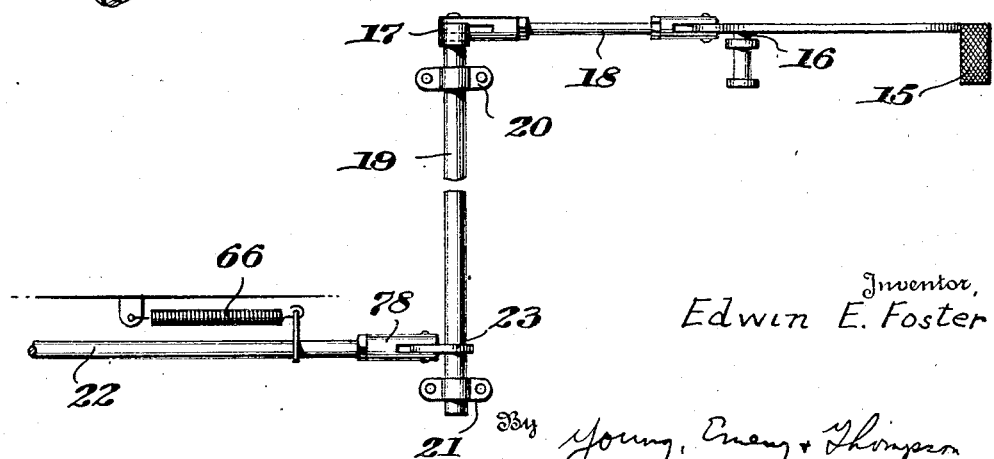

Jan. 4, 1949.  E. E. FOSTER  2,458,364
CLUTCH ACTUATOR AND ADJUSTER
Filed May 26, 1943  5 Sheets-Sheet 5

Inventor,
Edwin E. Foster
By Young, Emery & Thompson
Attorneys

Patented Jan. 4, 1949

2,458,364

UNITED STATES PATENT OFFICE 2,458,364

CLUTCH ACTUATOR AND ADJUSTER

Edwin E. Foster, Austin, Tex.

Application May 26, 1943, Serial No. 488,605

8 Claims. (Cl. 192—89)

1

This invention relates to an actuator for any operating mechanical device such as for instance the clutch of a vehicle, boat, or any other type of apparatus, machine or device. Thus while the actuator is applicable to any type of device or vehicle it is described and illustrated as applied to a clutch operating mechanism for a military vehicle such as a tank or armoured car.

It is therefore an object of this invention to provide a clutch operating mechanism with a device which will enable the operator to operate the clutch with the least effort possible commensurate with the proper and necessary operation of the vehicle. The invention permits the elimination of approximately two-thirds of the clutch pedal effort and a more compact unit which is completely out of the driver's way and still is incorporated in the clutch actuating system. Another advantage of the invention resides in the simple applicability to existing clutch actuating systems or devices as an added unit which is easily applied to vehicles already built and in use.

A further object of the invention resides in the adjustment features to compensate for wear which device is a separate unit which may be easily operated from the driver's seat when an adjustment in the operation of the clutch pedal seems necessary.

Another object of the invention resides in the provision of a special template or guide member which is for the purpose of marking the shaft to make it possible to apply an actuator clamp on the shaft in the proper position.

Further objects will be apparent from the following description when considered in connection with the accompanying drawings, in which:

Fig. 4 is an end view of Fig. 1 with some of the parts omitted,

Fig. 5 is a plan view partly in section of a ball bearing receiving cup,

Fig. 9 is a plan view of a clutch pedal linkage without the actuator and adjustor, Fig. 10 is a plan view of an adjustor unit for the clutch pedal linkage, Fig. 11 is a longitudinal sectional view of the adjustor unit.

2

Figure 14:
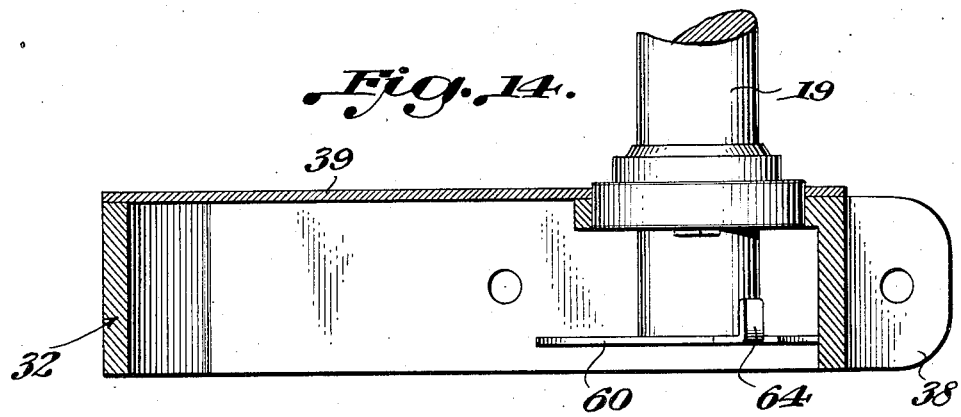
Figure 13:
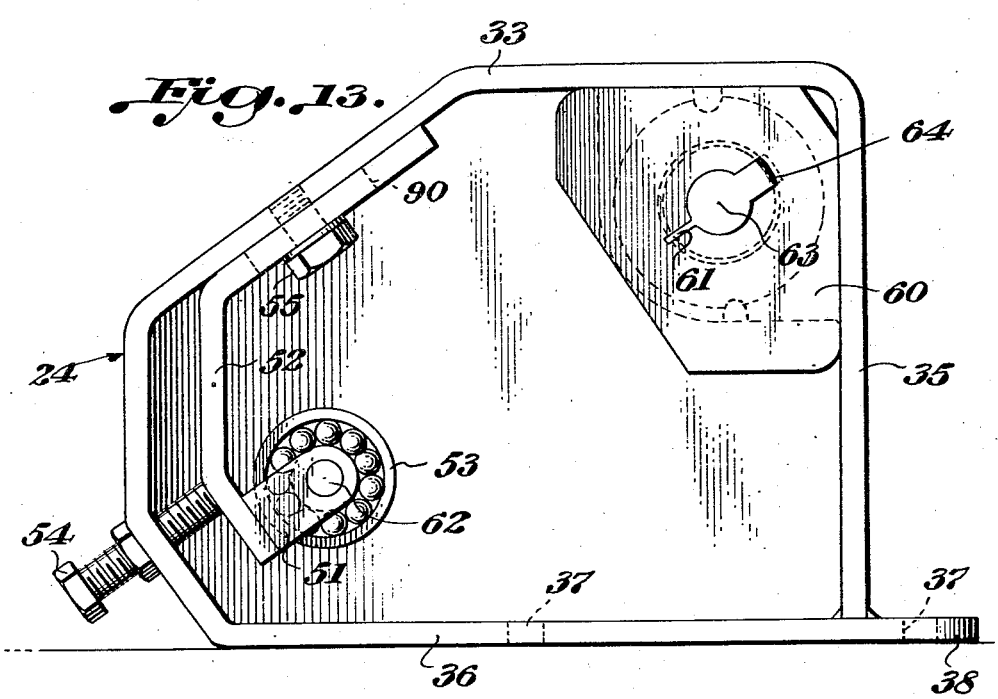

Fig. 12 is a perspective view of the clutch pedal linkage system with the actuator and adjustor connected in the system, Fig. 13 is a side elevation of a portion of the actuator showing another form of template in the position of use, and Fig. 14 is a top plan view partly in section of the actuator of Fig. 13.

Fig. 9 shows diagrammatically the clutch operating system without the invention applied thereto as applied to a vehicle such as a military tank, in which clutch pedal 15 is pivoted at bearing 16 and operates an arm 17 by means of a rod 18. The arm 17 is securely mounted on a cross shaft 19, the latter of which is rotatable in suitable bearings 20 and 21. A rod 22 is connected at 23 to the shaft 19 and this rod operates a thrust bearing, not shown, of a clutch by means of suitable elements. Fig. 12 illustrates the actuator 24 and the adjustor 25 applied to the linkage system. A tension link 26 is connected at one end to the adjustor 25 applied to the linkage system, and the other end to one end of an arm 27 pivoted at 28. The other end of the arm 27 is pivotally connected to a compression link 29, which latter is connected to a fork member 30 having a thrust bearing 31 pivotally mounted therein. Fig. 12 therefore illustrates where the actuator and adjustor are mounted in a clutch operating system of the type shown in Fig. 9, but it is of course understood that the actuator and adjustor may be mounted at other suitable points in the linkage system.

Referring now to Figs. 1 to 4 the actuator 24 is completely enclosed to keep out dust, dirt and other objects. A frame 32 consists of a suitably dimensioned strap iron member bent into the shape of a polygon, Figs. 1 and 2, with top portion 33, side portions 34 and 35, and bottom portion 36, the latter having perforations 37 therein, one in an extended part 38, by means of which, with the aid of bolts, not shown, the actuator is secured to the vehicle.

A back wall or side plate 39 is welded to the frame 32, in order to enclose the mechanism and make the box frame perfectly rigid. The bolt holes 37 are the same distance apart and the same distance from the shaft 19 as the bearing support 21, Fig. 9, which this box frame replaces. A ball bearing 40 is mounted in a bearing support block 41 which carries a load of the cross-shaft 19. A split clamp member 42 grips the end of the shaft 19, due to the tightening bolt 43 and the lock nut 44. A double arm or fork member 47 integral with the clamp 42 supports a ball bearing 45, by means of a pin 46, and a stamped metal cup 48 fits into the end of a compression spring 49 and is provided with a recess 50 which fits the outer race of the ball bearing 45. Identical pivot arrangements, a ball bearing 53 and a metal cup 48, are provided on the opposite end of the compression spring 49, in order to pivotally connect the spring to the double ears or lugs 51 of a slotted bracket 52. A slot 90 in the bracket 52 allows the latter to be moved back and forth in order to adjust the tension of the spring 49, to thereby adjust the load on the spring by means of an adjustment screw 54 threaded in the side portion 34 of the frame 32. The under surface part 91 of the top of the box frame 24 where the bracket 52 slides is made parallel to a line between the center of a pivot pin 55 and the center of the shaft 19, which is important as the spring 49 must be adjusted to fit different clutches and the pin 55 must move on the center line in order not to disturb the dead center position after the clamp 42 is located and fixed on the shaft 19. By locating the actuator on the end of the shaft 19 farthest away from the clutch pedal and by making the actuator do two-thirds of the clutch pedal work, the remaining third is the only load on the bearings ahead of the actuator during the downward stroke of the pedal; and on the release stroke of the pedal no load is carried through the bearings and pins at the pedal end of the linkage system. Due to the close proximity of the tension link 26 to the end of the shaft 19, Fig. 12, carrying the actuator clamp, the distortion in the shaft due to the actuator is negligible.

Figures 1, 3:
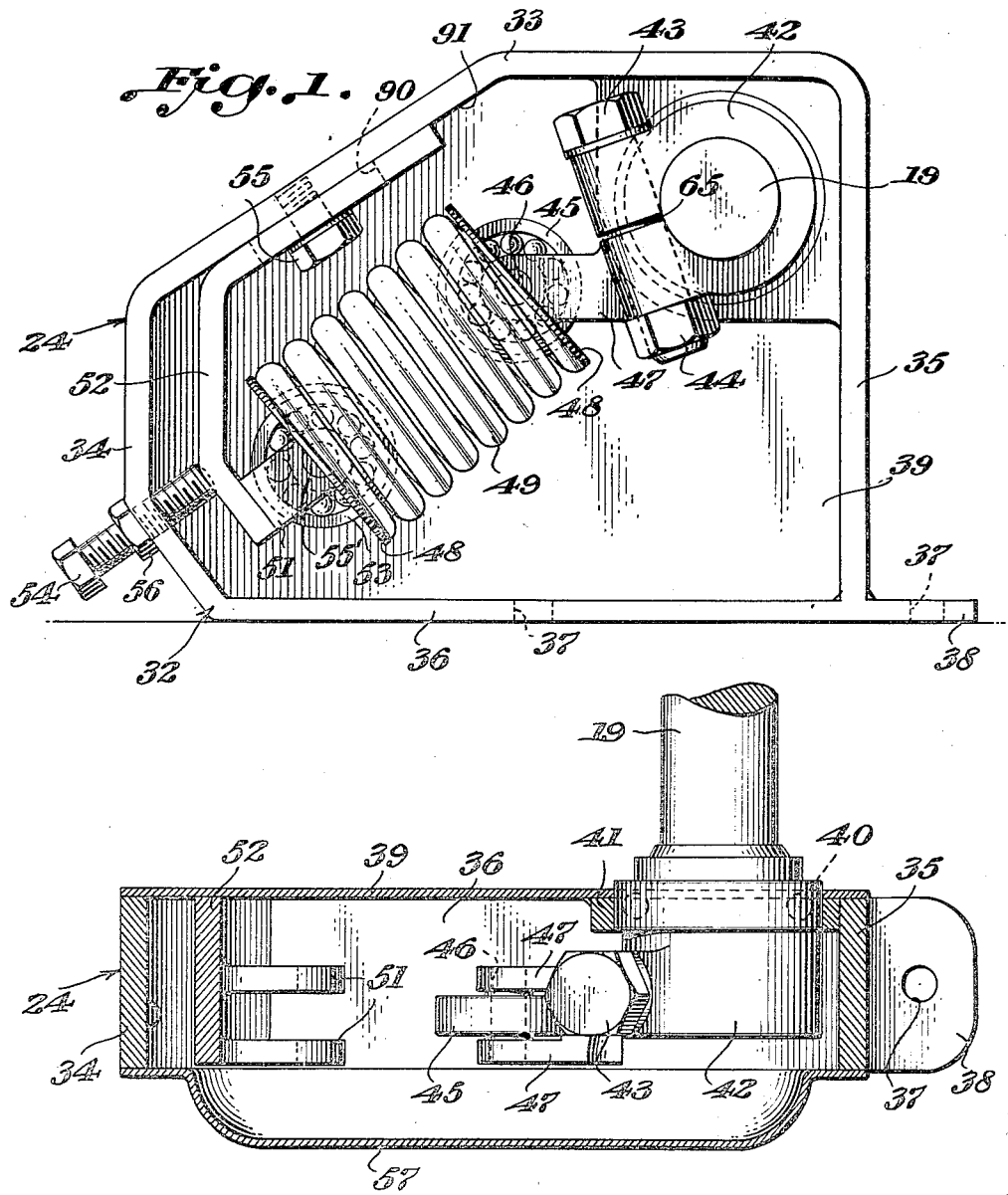
Figure 1 is a side elevation of the clutch actuator in the normal or clutch-engaged position with the clutch pedal at the top of its stroke of movement.
Fig. 3 is a top plan view partly in section of the actuator of Fig. 1 with certain parts omitted.
Figure 2:
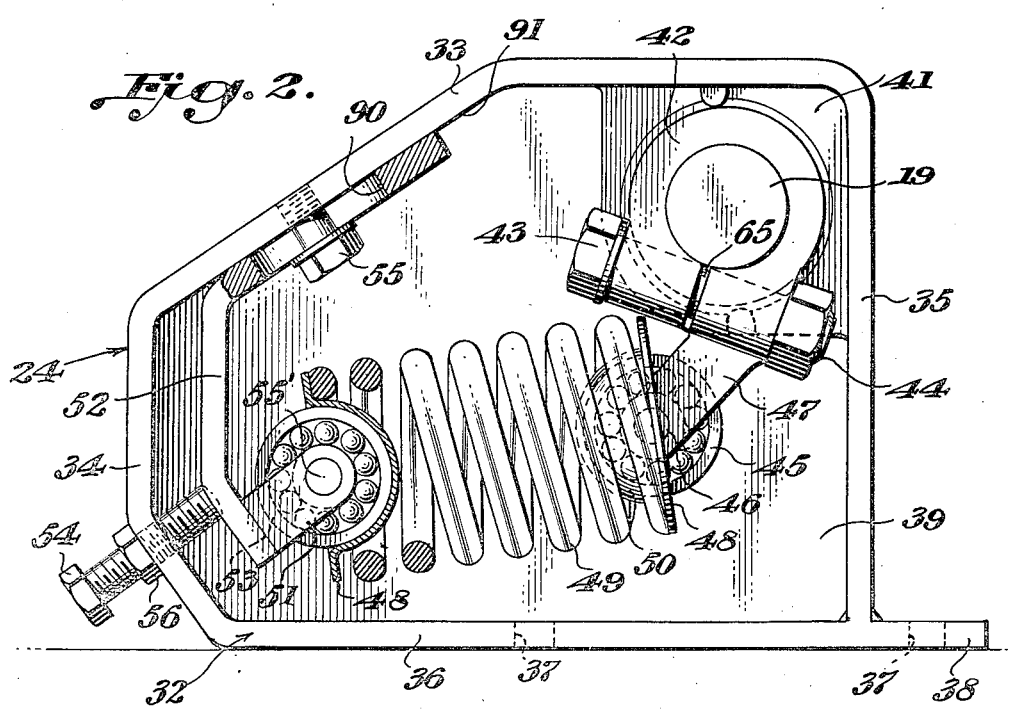
Fig. 2 is a view similar to Fig. 1 with the parts in the clutch-disengaged position with the clutch pedal at the bottom of its stroke.

As shown in Figs. 1 and 2 a screw bolt 54 passes through the slot 53 and is threaded in the top portion 33 of the frame 32. By tightening the bolt 54 the bracket 52 is maintained in adjusted position. Also the adjustment screw 54 is provided with a locking nut 56 to lock the screw 54 in position.

A closure plate 57, Figs. 3 and 4, may be removably secured to the side of the box opposite the permanent side plate 39.

The actuator may of course be built into a vehicle as the latter is manufactured and assembled. If, however, the actuator is to be installed into an existing vehicle, a part of the clutch operating members of which is shown in Fig. 9, the following procedure may be carried out.

Figures 6, 7, 8:
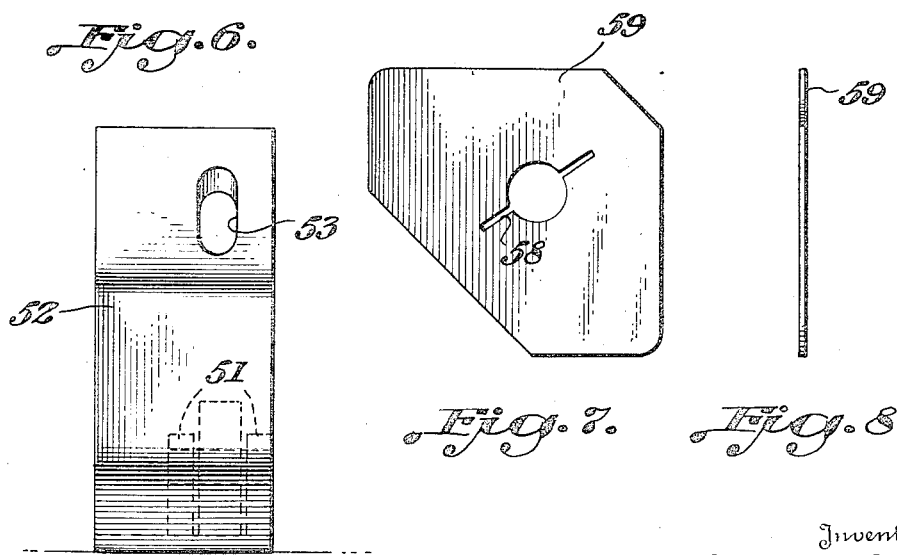
Fig. 6 is an end view of a slotted bracket.
Fig. 7 is a plan view of one form of template used to install the actuator.
Fig. 8 is an end view of the template.

The bearing support post 21 is first removed and the box or housing 32 of the actuator 24 is bolted to the floor of the vehicle by means of the two bolts formerly used to secure the post 21. The end of the cross shaft 19 will extend through the bearing 40 about one inch, and the split clamp 42 fits loosely over the end of the shaft. In order to determine the location at which the clamp 42 should be tightened, a thin metal template 59 or 60, shown in Figs. 7, 8 and 13, is provided with each actuator. This metal template is to be held in the corner of the box or frame 32, Fig. 13, over the end of the shaft and the end of the shaft is marked in a slot 58 in the template, with the clutch pedal held at the bottom of the free-play stroke. This free play stroke usually amounts to about 2", but is different on different clutches. The purpose of the free play is to allow the thrust bearing in the clutch to be entirely disconnected when the pedal is at its top position. When the shaft has been marked with the template at the time the pedal is held at the bottom of the free play, the slot in the clamp should line up with this mark on the end of the shaft.

Figs. 13 and 14 illustrate a modified form of template in position for use. The template 60 has a slot 61 which is exactly in line with the center line between the points 62 and 63, which is the dead center position of the spring. The shaft 19 is marked through the slot 61 when the clutch pedal is at the bottom of its free play stroke. This is in order that when the template is then removed and the clamp 42 tightened on the shaft 19, so that the slot in the clamp lines up with the mark, the springs in the clutch itself will always return the actuator to the dead center position.

It must be remembered that when an actuator is to be installed in the floor of a tank in which space is taken up by a number of elements like the transmission, the seats, etc., it is necessary for the mechanic who is installing this device to stand on his knees in a cramped position, and therefore, unless a template is used for marking the shaft, the clamp is apt to be fitted at a wrong position. Of course, it is possible to make this template in a number of different ways. For instance, it might be provided with a lug or finger 64, Figs. 13 and 14, which would insure the template staying firmly against the corner of the actuator housing, rather than depend on the mechanic to hold the template firmly against the corner.

In order to load the spring 49, the nut 56 is loosened and the set screw 54 backed off until the bracket 52 has moved as far to the left as it can go. Then with the pedal held all the way down, the slot 65 in the clamp 42 is lined up with the mark made on the end of the shaft 19, and the clamp bolt 43 is tightened. If necessary the lock nut 44 can be backed off against the wall in order to help compress the spring 49 and force the clamp clockwise about the shaft 19 until the slot lines up with the mark, after which the lock nut 44 should be tightened. With the pedal still held down, the adjustment screw 54 is tightened until the proper load is built up in the compression spring. The proper amount of load in the spring is determined by releasing the clutch pedal to see if the clutch returns freely. If it does not return freely, the adjustment screw 54 should be backed off until the clutch has the proper feel on the return. The screw 54 should then be tightened to grasp the bracket 52 and the lock nut 56 should also be tightened to maintain the proper adjustment. The operation of the actuator when installed is as follows:

In the position shown in Fig. 1, that is, with the pedal at the top of its stroke, the actuator serves to hold the clutch pedal at the top of the stroke with sufficient force to enable the driver to ride the clutch pedal with about fifty pounds force without moving the clutch pedal. This foot-rest feature is required in order to prolong the life of the thrust bearing. When the driver wishes to disengage the clutch he must supply slightly more than the fifty pounds at the beginning of the stroke. As the pedal moves through the free pedal stroke, the resistance offered by the actuator reduces to zero, as the pin 46 approaches the center line 62, 63, Fig. 13, or the dead center position. At that point the load of the clutch itself (which amounts to about 65 pounds at the beginning of the stroke) is picked up, but due to the momentum of the driver's foot and leg, is sufficient to carry through at dead center position without its seeming to be that much. As soon as the pedal has moved a short distance below the dead center position, the spring 49 supplies the necessary assistance to cause the pedal effort to be reduced about two thirds of what it normally was without the actuator. By actual gauge tests this actuator when installed in a tank gave a foot support at the top of the pedal stroke of 55 pounds, and the remainder of the stroke had a maximum of 45 pounds. This 45 pounds was the load nearer the dead center position. Even this can be lowered, if desired, by changing the angle of the adjustor 25 on the cross-shaft to give more leverage at the beginning of the pedal stroke and less at the end.

Wear in the clutch facings itself affects this actuator in the following manner: The springs (not shown) in the clutch help return the spring 49 from the position shown in Fig. 2 to the dead center position, after which the pull-back spring 66, Fig. 12, helps carry the spring 49 across the dead center position, where the spring 49 will help hold the pedal in the extreme upper position. As the clutch wears, the clutch springs will help restore the spring 49 not only to the dead center position, but slightly past it. The more wear that occurs, the further it will help it above dead center. This condition would cause the operator to notice an increase in the effort required near the beginning of the pedal stroke. It is this condition which makes it advisable or necessary to incorporate an easily operated clutch adjustor, to restore the original correct relation of the clutch springs to the clutch actuator, by lengthening the pull link 26. The clutch adjustor shown in Figs. 10 and 11, performs the same function as a turnbuckle placed in the link 26. However, the clutch adjustor 25 makes it possible for the driver to make an adjustment in a few seconds without the use of tools and without having to remove the cover from the housing which encloses the pull link 26 and the propeller shaft, which is directly above the pull-link.

The clutch adjustor 25 consists of a sliding block 67 moving in a slot 68 in the parallel tension bars 69 by means of a threaded screw member 70. The screw member 70 is provided with a notched handle wheel 71 on which contacts the free end of a leaf spring 72 secured to the block 67 by means of rivets 73 to form a locking device. A small hole 74 is provided in the leaf spring in line with a shaft 75 so that the shaft 75 can be punched out through the opposite hole after a screw 76 has been loosened and a cut-away portion in a washer 77 has been moved around to line up the shaft hole. To install this adjustor, the clevis 78, Fig. 9, is removed from the arm 23 and the actuator screw threaded onto the shaft 26 and the hardened pin 75 placed through a hardened sleeve which is made to fit the hole in the member 23 to which the clevis 78 was originally connected. The adjustor should be installed when the screw 76 is screwed almost completely in, as shown in Fig. 10. As the clutch wears the driver will unscrew the threaded adjustment screws 71 to lengthen the distance between the shaft 19 and the pull link 26. The hand knob 71 on this adustor is made to extend a few inches ahead of the pin 75 in order that the driver can reach it in the space allowed in the vehicle.

I claim as my invention:

1. A device for aiding the operation of a spring urged clutch of a vehicle and the like comprising a frame secured to the vehicle and operatively connected to a shaft of a clutch operator, a bracket mounted on the frame, a clamp member secured on the shaft, and a compression spring mounted between the bracket and the clamp member to assist the operation of the clutch by overcoming a part of the force exerted by the clutch spring.

2. A device for aiding the operation of a clutch of a vehicle and the like comprising a frame in the shape of a polygon secured to the vehicle, a bearing member secured to the frame in which a shaft of a clutch operator rotates, a bracket adjustably secured to a side of the frame, a clamp member secured on the shaft, a pair of ball bearings, one mounted on the bracket and the other on the clamp member, and a compression spring provided between the ball bearings, said spring being shiftable by means of said shaft when the latter is rotated upon actuation of the clutch to thereby eliminate a part of the effort required to operate the clutch.

3. A device for aiding the operation of a clutch of a vehicle and the like comprising a frame in the shape of a polygon secured to the vehicle, a bearing member secured to the frame in which a shaft of a clutch operator rotates, a bracket adjustably secured to a side of the frame, a clamp member secured on the shaft, a pair of ball bearings, one mounted on the bracket and the other on the clamp member, a fork member integral with the clamp member and to which its ball bearing is mounted, and a compression spring provided between the ball bearings, said spring being shiftable by means of said shaft when the latter is rotated upon actuation of the clutch to thereby eliminate a part of the effort required to operate the clutch.

4. A device for aiding the operation of a clutch of a vehicle and the like comprising a frame secured to the vehicle, a bearing member secured to the frame in which a shaft of a clutch operator rotates, a bracket secured to the frame, a clamp member secured on the shaft, a pair of ball bearings, one mounted on the bracket and the other on the clamp member, and a spring provided between the ball bearings, said spring being shiftable by means of said shaft when the latter is rotated upon actuation of the clutch to thereby eliminate a part of the effort required to operate the clutch.

5. A device for aiding the operation of a clutch of a vehicle and the like comprising a frame secured to the vehicle, a bearing member secured to the frame in which a shaft of a clutch operator rotates, a bracket secured to the frame, a clamp member secured on the shaft, a pair of ball bearings, one mounted on the bracket and the other on the clamp member, a fork member integral with the clamp member and to which its ball bearing is mounted, and a spring provided between the ball bearings, said spring being shiftable by means of said shaft when the latter is rotated upon actuation of the clutch to thereby eliminate a part of the effort required to operate the clutch.

6. A device for aiding the operation of a clutch of a vehicle and the like comprising a frame in the shape of a polygon secured to the vehicle, a bearing member secured to the frame in which a shaft of a clutch operator rotates, a bracket adjustably secured to a side of the frame, a clamp member secured on the shaft, a pair of ball bearings, one mounted on the bracket and the other on the clamp member, a compression spring provided between the ball bearings, said spring being shiftable by means of said shaft when the latter is rotated upon actuation of the clutch to thereby eliminate a part of the effort required to operate the clutch, and means mounted in the frame for adjusting the bracket relative to the frame.

7. A device for aiding the operation of a clutch of a vehicle and the like comprising a frame secured to the vehicle, a bearing member secured to the frame in which a shaft of a clutch operator rotates, a bracket adjustably secured to the frame, a clamp member secured on the shaft, a pair of bearings, one mounted on the bracket and the other on the clamp member, and a spring provided between the bearings, said spring being shiftable by means of said shaft when the latter is rotated upon actuation of the clutch to thereby eliminate a part of the effort required to operate the clutch.

8. A device for aiding the operation of a clutch of a vehicle and the like comprising a frame secured to the vehicle, a bearing member secured to the frame in which a shaft of a clutch operator rotates, a bracket secured to the frame, a clamp member secured on the shaft, a pair of ball bearings, one mounted on the bracket and the other on the clamp, and a resilient force applying means provided between the ball bearings, said means being shiftable by said shaft when the latter is rotated upon actuation of the clutch to thereby eliminate a part of the effort required to operate the clutch.

EDWIN E. FOSTER.

REFERENCES CITED

The following references are of record in the file of this patent:

UNITED STATES PATENTS

| Number | Name | Date |
|---|---|---|
| 602,586 | Morris | Apr. 19, 1898 |
| 737,560 | Nunnally | Aug. 25, 1903 |
| 1,171,341 | Huff | Feb. 8, 1916 |
| 1,804,903 | Wemp | May 12, 1931 |
| 1,860,636 | Tibbetts | May 31, 1932 |
| 1,927,643 | Hughes | Sept. 19, 1933 |
| 2,072,010 | Moorhouse | Feb. 23, 1937 |
| 2,073,705 | Moorhouse | Mar. 16, 1937 |
| 2,096,151 | Watt | Oct. 19, 1937 |
| 2,171,385 | Zeidler | Aug. 29, 1939 |
| 2,177,052 | Blough | Oct. 24, 1939 |
| 2,234,459 | Wemp | Mar. 11, 1941 |

FOREIGN PATENTS

| Number | Country | Date |
|---|---|---|
| 23,267 | British | Oct. 28, 1908 |
| 446,636 | British | May 4, 1936 |